United States Patent [19]

Powell et al.

[11] Patent Number: 5,593,017

[45] Date of Patent: Jan. 14, 1997

[54] METHOD AND APPARATUS FOR IDENTIFYING INFORMATION CONTAINED IN SURFACE DEVIATIONS

[75] Inventors: Ken R. Powell, Centreville; Rusty Driscoll, Leesburg, both of Va.

[73] Assignee: Environmental Products Corporation, Fairfax, Va.

[21] Appl. No.: 214,498

[22] Filed: Mar. 18, 1994

[51] Int. Cl.$^6$ .................................................. G07F 7/06
[52] U.S. Cl. .......................... 194/212; 194/328; 194/214; 209/524; 209/583
[58] Field of Search .................................... 194/205, 208, 194/209, 212, 214, 328, 330; 209/524, 538, 583, 930

[56] References Cited

U.S. PATENT DOCUMENTS

| | | | |
|---|---|---|---|
| 218,577 | 8/1879 | Richards | 194/214 X |
| 632,938 | 9/1899 | Greenburg | 194/214 X |
| 3,753,249 | 8/1973 | Silverman . | |
| 3,786,238 | 1/1974 | Heisner . | |
| 3,836,755 | 9/1974 | Ehrat . | |
| 3,963,918 | 6/1976 | Jensen et al. . | |
| 4,066,873 | 1/1978 | Schatz . | |
| 4,108,367 | 8/1978 | Hannan . | |
| 4,160,522 | 7/1979 | Dikinis . | |
| 4,211,918 | 7/1980 | Nyfeler et al. . | |
| 4,250,217 | 2/1981 | Greenaway . | |
| 4,316,533 | 2/1982 | Hughes et al. . | |
| 4,341,952 | 7/1982 | John et al. . | |
| 4,433,437 | 2/1984 | Fantone . | |
| 4,443,697 | 4/1984 | Ryan et al. . | |
| 4,451,068 | 5/1984 | Hall et al. . | |
| 4,568,141 | 2/1986 | Antes . | |
| 4,579,216 | 4/1986 | DeWoolfson et al. | 194/212 |
| 4,592,893 | 6/1986 | Poppe et al. . | |
| 4,641,017 | 2/1987 | Lopata . | |
| 4,642,470 | 2/1987 | Planke . | |
| 4,677,285 | 6/1987 | Taniguchi . | |
| 4,700,078 | 10/1987 | Mizuno et al. . | |
| 4,715,623 | 12/1987 | Roule et al. . | |
| 4,717,026 | 1/1988 | Fischer et al. . | |
| 4,720,325 | 1/1988 | Rausing et al. . | |
| 4,786,084 | 11/1988 | Karney et al. . | |
| 4,791,284 | 12/1988 | Ludden . | |
| 4,813,712 | 3/1989 | Scopes . | |
| 4,832,445 | 5/1989 | Haines et al. . | |
| 4,837,425 | 6/1989 | Edwards . | |
| 4,879,457 | 11/1989 | Ludden . | |
| 4,919,274 | 4/1990 | Hammond | 209/583 |
| 4,930,263 | 6/1990 | Rando . | |
| 4,932,685 | 6/1990 | Mancuso . | |
| 4,953,682 | 9/1990 | Helbawi | 194/208 |
| 5,003,600 | 3/1991 | Deason et al. . | |

(List continued on next page.)

FOREIGN PATENT DOCUMENTS

| | | | |
|---|---|---|---|
| 0488952A2 | 11/1991 | European Pat. Off. . | |
| 0561148 | 9/1993 | European Pat. Off. | 194/208 |
| 1-175093 | 7/1989 | Japan | 194/212 |
| 151427 | 6/1993 | Japan | 194/208 |

Primary Examiner—Karen B. Merritt
Assistant Examiner—Scott L. Lowe
Attorney, Agent, or Firm—Finnegan, Henderson, Farabow, Garrett & Dunner

[57] ABSTRACT

An apparatus for identifying information contained in deviations in the surface of an article, such as aluminum cans, glass bottles, and plastic bottles, has a source for radiating the article to provide a reflection from the deviations. An observing device observes the deviations in the reflection characteristics. A computer algorithm identifies the deviations and determines whether they correlate to a known pattern of surface deviations. The deviations are in the form of a plurality of lines having a predetermined uniquely identifiable spacing, providing a pattern which may be easily detected by its reflection characteristics and compared to a known pattern of surface deviations. The plurality of lines may be arcs orientated relative to a point on the surface of the article to provide an origin for the arcs, thereby permitting the article to be rotated about its origin for easy location and measurement.

23 Claims, 6 Drawing Sheets

U.S. PATENT DOCUMENTS

| | | |
|---|---|---|
| 5,059,776 | 10/1991 | Antes . |
| 5,064,258 | 11/1991 | Inokuchi et al. . |
| 5,082,516 | 1/1992 | Akao et al. . |
| 5,101,184 | 3/1992 | Antes . |
| 5,149,948 | 9/1992 | Chisholm . |
| 5,199,744 | 4/1993 | Shenton . |
| 5,306,899 | 4/1994 | Marom et al. ............... 235/382 |
| 5,361,913 | 11/1994 | Melchionna ............... 209/583 |
| 5,437,358 | 8/1995 | Schiffelholz ............... 194/212 |

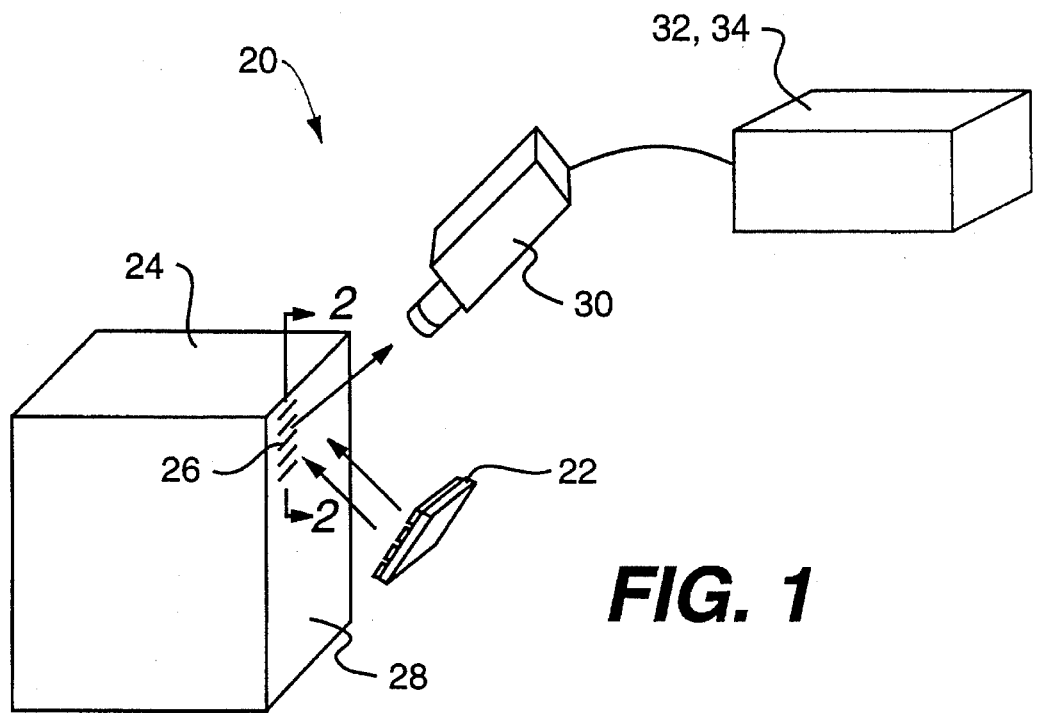
FIG. 1
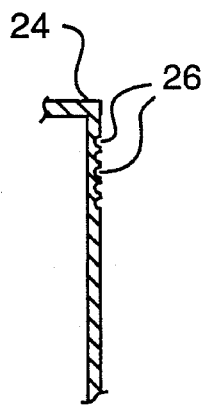 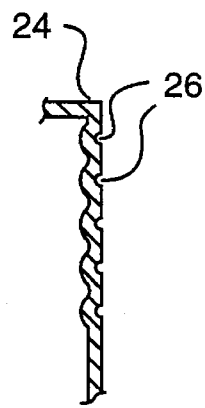 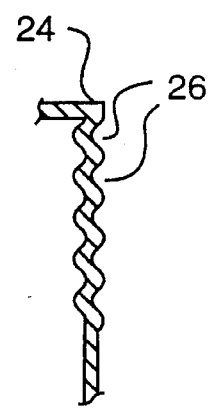
FIG. 2A  FIG. 2B  FIG. 2C

METHOD AND APPARATUS FOR IDENTIFYING INFORMATION CONTAINED IN SURFACE DEVIATIONS

BACKGROUND OF THE INVENTION

1. Field of the Invention

This invention relates to identifying information stored in the surface of an article, and more particularly to a method and apparatus for determining whether an article contains predetermined surface deviations corresponding to a known quantity of information. Even more particularly, it relates to the collection of a recyclable article having point of sale information encoded in a surface of the article.

2. Description of the Related Art

With the increasing emphasis in recent years on environmental protection, the recycling of used beverage containers and other similar articles has become an important factor in the conservation effort. More specifically, the recycling of aluminum, glass and plastic containers has proven to be environmentally beneficial.

On the other hand, non-returnable containers for beverages and other goods are widely used because their cost has been less than the cost of recycling and/or cleaning reusable deposit containers and bottles. One significant effect of the widespread use of non-deposit containers has been increased litter in public places, and overflow of garbage dumps and landfills.

To combat litter and increase the amount of material that is recycled, several states have enacted mandatory "deposit laws" which require the use of containers having an added deposit cost. When the customer purchases a product in such a container, a container deposit, typically one to five cents, is added to the purchase price. After consumption of the product, the consumer can obtain a refund of the deposit by returning the empty container, often to the retailer, for recycling. The amount of the deposit may be adjusted to create an incentive for returning the container that is greater than the inconvenience in doing so. In these states, retailers generally collect the used containers and sell them to distributors or others who pay the retailer for the scrap value of the containers plus an amount to cover the retailer's handling costs.

Other states, cities, and countries have enacted mandatory curbside recycling programs, where consumers place recyclable beverage containers in bins at curbside for pickup and removal to recycling centers.

Since the high labor cost of processing recycled material often makes recycling uneconomic, especially for retailers, various automatic machines that accept material for recycling and issue deposit refunds have been proposed. These machines relieve the burdens on the grocery industry, and those who must collect the containers, pay the refunds, and store the returned articles.

Other recycling machines determine whether an inserted article is a "participating" article by using a laser scanner within the recycling machine to detect the presence of and read a barcode, or UPC. It is known to use a laser scanner having a low power laser emitter and a laser reader. The laser emitter of the laser scanner projects a light pattern across the surface of the inserted article which is received by the laser reader thereby reading the barcode. The inserted article is rotated to ensure that the laser scanner reads the barcode.

If the laser scanner does not detect a barcode on the inserted article, the article is rejected and is therefore a "nonparticipating article" which is returned to the consumer through the reject port. Further, if the laser scanner does detect and read a barcode but cannot match that barcode with a predetermined list of container barcodes, the inserted article is also rejected as a nonparticipating article.

The laser scanner rejects articles as nonparticipating if a barcode is not found in order to reject any nonrecyclable object which might be inserted into the assembly, thereby preventing mixture of recyclable articles with waste material, and also preventing damage to the assembly. The laser scanner also rejects objects without a barcode or with barcodes that cannot be matched because retailers and distributors of the containers are compensated for recycling and billed for the scrap value of the material through use of information obtained by reading the barcode. The proper credits and debits cannot be made if a barcode cannot be read and matched. Thus, a number of barcodes are placed in the memory of the laser scanner so that various different containers may be accepted.

If the laser scanner does detect, read and match a barcode, the article is a "participating article," and the article is densified and stored according to other information obtained by other devices. Typically, these other devices determine whether the inserted article consists of the correct material and weight. If not, the article is rejected.

Significant problems have been experienced with the recycling machines presently utilized in states with mandatory "deposit laws". Containers sold within a deposit state typically have the state name, the word "deposit" or "refund", and the amount of deposit on the surface of the container. For example, cans typically have this information either printed on or embossed in the top of the can. However, the recycling machines cannot distinguish between containers sold in a deposit state and containers that were not sold in a deposit state. Therefore, the machines store and pay for containers not entitled to a return deposit. It is desirable therefore to provide a recycling machine with the capability of determining whether a container is entitled to a deposit refund based on its point of sale.

More generally, it is desirable to provide a method and apparatus for determining whether an article has a predetermined pattern of surface deviations corresponding to a known quantity of information. It is contemplated that such technology could expand the use of barcodes to provide additional information useful to the entire container industry, as well as the overall recycling industry.

Additionally, it is desirable to provide an article with a permanent quantity of information stored in the surface of the article.

SUMMARY OF THE INVENTION

Accordingly, it is an object of the present invention to efficiently accept and store large quantities of articles for recycling, while rejecting articles if certain indicia indicating a deposit refund is not present.

It is a further object of the present invention to provide a machine that can identify a pattern of surface deviations in an article.

It is an additional object of the present invention to provide a machine capable of obtaining information from the surface of an article even when obstructions, such as dirt, saliva and syrup, would otherwise render the surface incapable of being read by a laser scanner.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a method for identifying information stored in the surface of an article, comprising the steps of: introducing the article having predetermined surface deviations to a reading area; illuminating the article; measuring reflection characteristics of the surface of the article; identifying surface deviations by the reflection characteristics of the surface; comparing surface deviations to at least one known pattern of surface deviations; and determining whether the surface of the article contains identifying information.

The surface of the article may be incised, indented, embossed, any combination thereof, or altered in any other manner to form the predetermined surface deviations. Moreover, naturally occurring surface deviations in an article may be exploited. Preferably, the surface deviations include a plurality of lines having a predetermined uniquely identifiable spacing. The plurality of lines are preferably arcs oriented relative to a point on the surface of the article to provide an origin for the arcs. The spacing between the plurality of arcs is preferably varied.

Further, the invention may comprise the step of inserting the article into a reverse vending machine or other recycling device prior to introducing the article to the reading area. Additionally, the invention may comprise the step of rejecting the article not having at least one known pattern of surface deviations. Finally, if the article has at least one known pattern of surface deviations, it may be densified and/or stored.

The invention also comprises an apparatus for identifying information contained in a surface of an article. The apparatus includes means for radiating the article to provide a reflection from a plurality of deviations in the surface of the article; means for observing the deviations by reflection caused by radiating the surface of the article; means for identifying the deviations in the surface of the article; and means for determining whether the deviations on the surface of the article correlate to a known pattern of surface deviations.

A preferred radiating means is a diffuse illuminating source, such as a LED. Another preferred radiating means is a laser diode. The preferred observing means is a CCD camera. The identifying and determining means preferably use computer algorithms.

Additionally, the invention comprises an article having a surface with information stored therein. The article includes a portion on the surface of the article that defines a base reflection characteristic; and a pattern defined in the portion, the pattern comprising surface deviations corresponding to a known quantity of information and having a known reflection signal when exposed to a predetermined radiation.

It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of the specification illustrate a preferred embodiment of the invention. Together with the description, they serve to explain the objects, advantages and principles of the invention. In the drawings:

FIG. 1 is a perspective view of an embodiment of an apparatus for identifying information contained in deviations in the surface of an article according to the present invention;

FIG. 2A is a partial enlarged cross-sectional view taken along line 2—2 of FIG. 1 illustrating an embodiment of a preferred pattern of surface deviations;

FIG. 2B is a partial enlarged cross-sectional view taken along line 2—2 of FIG. 1 illustrating another embodiment of a preferred pattern of surface deviations;

FIG. 2C is a partial enlarged cross-sectional view taken along line 2—2 of FIG. 1 illustrating yet another embodiment of a preferred pattern of surface deviations;

DESCRIPTION OF THE PREFERRED EMBODIMENTS

Figure 3:
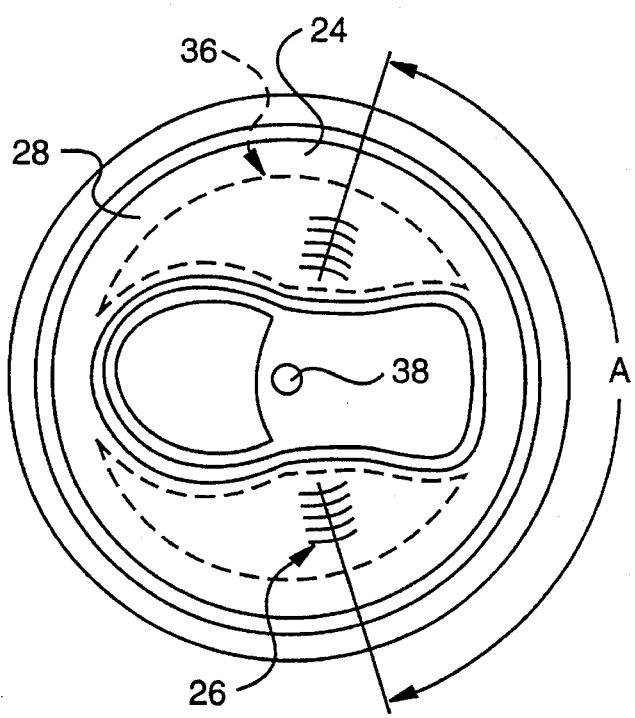
FIG. 3 is a schematic view of an article having predetermined surface deviations in accordance with the present invention.

Reference will now be made in detail to the present preferred embodiments of the invention, as illustrated in the accompanying drawings.

An apparatus for identifying information contained in a surface of a article according to the present invention comprises means for radiating the article to provide a reflection from a plurality of deviations in the surface of the article.

The exemplary embodiment of the apparatus and method for identifying information contained in a surface of an article 24 of the present invention is shown in FIG. 1 and designated generally by reference numeral 20.

As embodied herein, and referring to FIG. 1, information identifying apparatus 20 includes means for radiating the article 24 to provide a reflection from a plurality of deviations 26 in the surface 28 of the article 24. Radiating means include an illuminating source or more specifically a diffuse illuminating source, such as a light emitting diode (LED). Alternatively, radiating means may operate at a wavelength outside the visible light spectrum. For example, an infrared wavelength could be utilized to see through contaminants on the surface 28 of an article 24 to provide the information identifying apparatus 20 with the capability of providing a reflection from the plurality of deviations 26 in the surface 28 of the article 24 even under the most adverse of conditions. The adverse conditions that an infrared wavelength can penetrates include dirt, food, and even materials such as black electrical tape. A preferred embodiment for radiating means is a laser, and preferably a line generating laser diode 22. Moreover, laser diode 22 may be pulsed when the article 24 to be analyzed is in motion, thereby providing an opportunity for a snapshot analysis of the article.

As embodied herein, and referring to FIGS. 2A, 2B, and 2C, the predetermined surface deviations 26 in the article 24 may be provided, for example, by incising, indenting, or embossing the surface 28 of the article 24. However, any manner of providing the predetermined surface deviations 26 may be used depending upon the material of the article 24 and various design considerations. Preferably, the surface deviations 26 include a plurality of lines having a predetermined uniquely identifiable spacing.

As shown in FIG. 2A, the article 24 may be incised to provide a plurality of surface deviations 26 that will cause changes in the reflection along the surface 28 of the article 24 when radiated. For example, a thin-walled aluminum article may be incised with a generally square nose punch to provide a plurality of deviations or troughs approximately 0.001 inches deep, 0.001 inches wide, and 0.25 inches long. Incising compresses the aluminum to change the material thickness and density. During incising some material may flow out of the trough along its edges and towards the surface 28 of the article 24.

As shown in FIG. 2B, the article 24 may be indented by bending the material of article 24 while maintaining the material thickness. Due to the structural properties, available area for placement of surface deviations, material thickness, and article use, indenting may be preferable to incising in some instances. Concerns about maintaining the strength of the material may also limit pattern placement and the method for producing surface deviations. However, whether indenting, incising, or any other technique is used to provide the predetermined surface deviations 26 in the surface 28 of the article 24, the present invention can be programed to recognize the deviations 26 having a known reflection and spacing. The pattern of deviations should be chosen to avoid potentially similar reflection changes that may naturally occur on the article. Naturally occurring reflection changes may be caused by printing or other coloring changes, changing materials, and changing surface textures and shapes. Many of these situations can be avoided by placing the surface deviations in a predetermined location on the article and then orienting the article 24 within the information identifying apparatus 20 so that only the predetermined location is analyzed for the pattern.

As shown in FIG. 2C, the article 24 may be embossed. Embossing in accordance with the present invention is simply raising surface deviations above the base surface level to provide a reflection change from the base surface level. As with incising and indenting above, the method of obtaining the raised surface deviations is not significant other than in how the raised area effects the reflection characteristics of the surface 28 of the article 24. The surface texture of the base surface level is not particularly relevant so long as it does not repeat the reflection signals of the pattern.

In accordance with the invention, observing means are provided for observing the deviations by the reflection caused by radiating the surface of the article. As embodied herein, and referring to FIG. 1, information identifying apparatus 20 includes means for observing the deviations 26 by reflection signals caused by radiating the surface 28 of the article 24. The observing means is preferably a CCD camera 30. The CCD camera 30 senses the illuminated surface 28 of the article 24. The preferred CCD camera 30 is a line type device, as is well-known in the art, however an area type device, as is also well-known in the art, may be used in line scan mode. The area-type CCD camera offers the potential to use a single CCD sensor subsystem for multiple systems, such as a reverse vending machine capable of accepting glass, plastic, and metal articles. While a CCD camera 30 is preferred for observing the deviations 26 by reflection signals, any other device, such as an array of photovoltaic devices, capable of recognizing changes in reflection on the surface of the article may be used according to the design requirements of the system.

In accordance with the invention, identifying means are provided for identifying the deviations in the surface of the article. As embodied herein, and referring to FIG. 1, information identifying apparatus 20 includes means for identifying the deviations 26 in the surface 28 of the article 24. The identifying means is preferably a computer algorithm used by a CPU 32. Algorithm development was based on DADISP, a commercial off-the-shelf PC-based data analysis software package. The algorithm evaluates the reflection signal characteristics of a radiated surface having a plurality of surface deviations 26. The algorithm uses convolutions or pattern matching of a binary data set containing position information of data peaks which meet a maximum width and minimum contrast. Alternatively, the algorithm counts time lapsed between a predetermined number of peaks and upon finding the correct number of peaks within the predetermined time frame counts the time between each consecutive peak to find the pattern. Algorithm results are analyzed by using data collected from an article serving as a master or calculated from theoretical reflection changes for specific surface deviations in a known material radiated by a known wavelength.

CPU 32 is the preferred identifying means; the identifying means uses the algorithm, which comprises the following steps: calculating the differences between adjacent analog data points; identifying the peak locations on the different data using minimum magnitude and maximum width acceptance criteria; identifying the valley locations of the different data using minimum magnitude and maximum width acceptance criteria; and identifying the peak locations of the raw data by finding peak valley pairs using maximum acceptance criteria.

In accordance with the invention, determining means are provided for determining whether the identified deviations correlate to a known pattern of surface deviations. As embodied herein, and referring to FIG. 1, information identifying apparatus 20 includes means for determining whether identified deviations 26 correlate to a known pattern of surface deviations 26. The determining means is preferably a computer algorithm used by a CPU 34 and may be combined with CPU 32 of the identifying means. CPU 34 is the preferred determining means; the determining means use the algorithm, which performs selective convolutions to determine if the spacing pattern of peak locations match a reference mask. If the article 24 will not always be at the same distance from the CCD camera 30, a variety of reference masks may be developed for additional convolutions, i.e. a near-to-mid range mask and a mid-to-far range mask. A preferred convolution mask or incisement pattern is evaluated in order to minimize the false detection array of unmarked articles.

It has been determined that a predetermined pattern of surface deviations 26 placed on a surface 28 of an article 24 will produce certain unique reflection characteristics in response to radiating the article 24 with a predetermined wavelength. The specific wavelengths or source of radiation will change according to whether the article is aluminum, steel, glass, plastic, or the like. The article 24 need only have a portion of a surface 28 to serve as a base line of reflection so that the predetermined surface deviations 26 on this portion cause a sufficient reflection signal when radiated to be measured and compared against at least one known pattern of surface deviations.

The present invention offers numerous advantages over other ways of marking articles for automated reading of stored information. No ink or other markings, such as barcode labels, whether printed or affixed onto the article, are required for the present invention. Therefore, there is nothing to be rubbed off, lost, removed, or otherwise separated from the article since the surface deviations become a permanent part of the article itself. Additionally, the reflection characteristics of the surface of the article in response to being radiated are not as susceptible as barcoding and ink marks to interference caused by dirt, syrup, saliva, and other surface contaminants.

Figure 4:
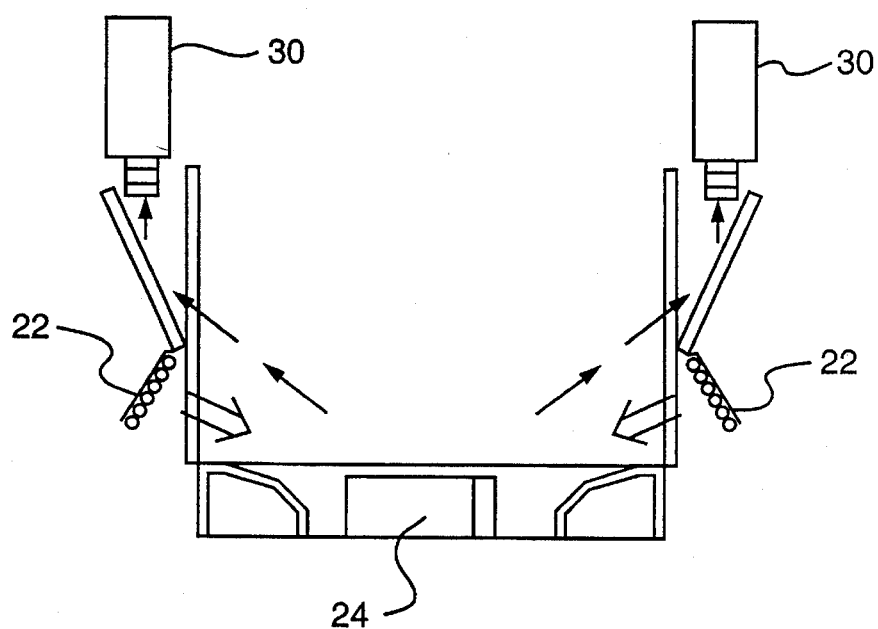
FIG. 4 is a schematic view of a product identification assembly having an apparatus for identifying information in an arrangement for identifying predetermined surface deviations on the surface of an article.

The features of the invention described above can be more easily understood by a review of FIGS. 3 and 4, which depict an aluminum can top with predetermined surface deviations in its surface and a preferred information identifying assembly for use in a reverse vending machine, respectively.

As shown in FIG. 3, the article 24, (in this case the top of a can), has a surface 28 with a portion 36 defining a base reflection characteristic, and a pattern of surface deviations 26 defined in the portion 36. The pattern includes surface deviations 26 corresponding to a known quantity of information and having a known reflection signal when exposed to a predetermined radiation. The preferred pattern is incised into the portion 36 of the surface 28 of the article 24 within a generally rectangular area of approximately 0.25 by 0.26 inches. The pattern includes a plurality of arcs oriented relative to a point on the surface 28 of the article 24 providing an origin 38 for the plurality of arcs. The top is attached to a container, which approximately forms a cylinder having opposite ends and an axis extending through the ends about the center of gravity of the cylinder. Preferably the origin 38 for the plurality of arcs is located approximately where the container axis intersects the top. Five arcs are most preferred with each arc having an arc section of approximately 0.25 inches, a depth of 0.001 to 0.002 inches, and a width of 0.001 to 0.002 inches. The spacing between the five arcs from an inner arc closest to the origin to the outer arc is approximately 0.05, 0.06, 0.07, and 0.08 inches, respectively. Additionally, a second and preferably identical pattern is placed on a second portion 36 of the surface 28 of the article 24. The two patterns preferably have an angle A of separation ranging from 30 to 150 degrees apart relative to the same origin with approximately 150 degrees being more preferable. A rounded tool with a radius of 3–5 thousanths-of-an-inch and a rough surface finish provides a preferred incised pattern.

The pattern is preferably not oriented with the brushed surface finish of the aluminum can top. This is due to the finish having a strong specular reflection component. However, two patterns located on the can top as described above assures that at least one pattern is not oriented with the brushed finish of the can top. Further, a laser/specular approach to radiating the article is not sensitive to specular saturation from the brush marks since only a small area respectively is being observed.

As embodied herein, and referring to FIG. 4, a preferred configuration of laser diode 22 and camera 30 is illustrated for an information identifying apparatus 20 that mounts within a reverse vending machine. The pattern on the can top shown in FIG. 3 is sensed by one of the CCD cameras 30 performing a line scan of the rotating can and is illuminated by one of the laser diodes 22. The two cameras 30 and laser diodes 22 are used so that the can top to can bottom orientation within a mechanism 40 for receiving the article 24 may be in either direction. The can is preferably rotating to allow the reverse vending machine to use a barcode reader to determine if the container is a "participating" article. The arc surface deviations take advantage of the existing rotation of the can in many existing reverse vending machines. The narrow width (approximately 0.25 inches) of the pattern reduces the observation time at full rotation speed (approximately 4.5 rev/s in many existing reverse vending machines) providing approximately 11 ms transit time. Therefore, the laser diode 22 is pulsed to produce a static image for the camera 30. Operation of the laser diode 22 with one millisecond exposure stops the apparent motion of the rotating can. The CCD camera 30 is oriented to align a 192 pixel row to image vertically on the can top and bottom. The depth of field of a standard lens is adequate with a high-intensity laser diode. The high angle of view of the camera minimizes the depth of field requirement. Analysis of single line data from the static images is preformed by an algorithm used by a CPU. Preferably mechanism 40 for receiving an article 24 is large enough to accept various size articles, such as both 16- and 12-ounce cans.

Since the can may be positioned anywhere within the mechanism 40 for receiving an article, a unique convolution mask is preferred for each of two imaging distance ranges (e.g. near middle and far middle). Based on our laboratory experiments, a threshold range of ±15 to ±30 (out of a full scale range of 255) ensures detection of the incisement contrast changes. The full scale range of 255 is a relative scale for analog to digital (A to D) conversion. Zero on the scale corresponds to dark or no reflection and 225 on the scale corresponds to the maximum light or reflection the equipment can resolve.

Figure 5:
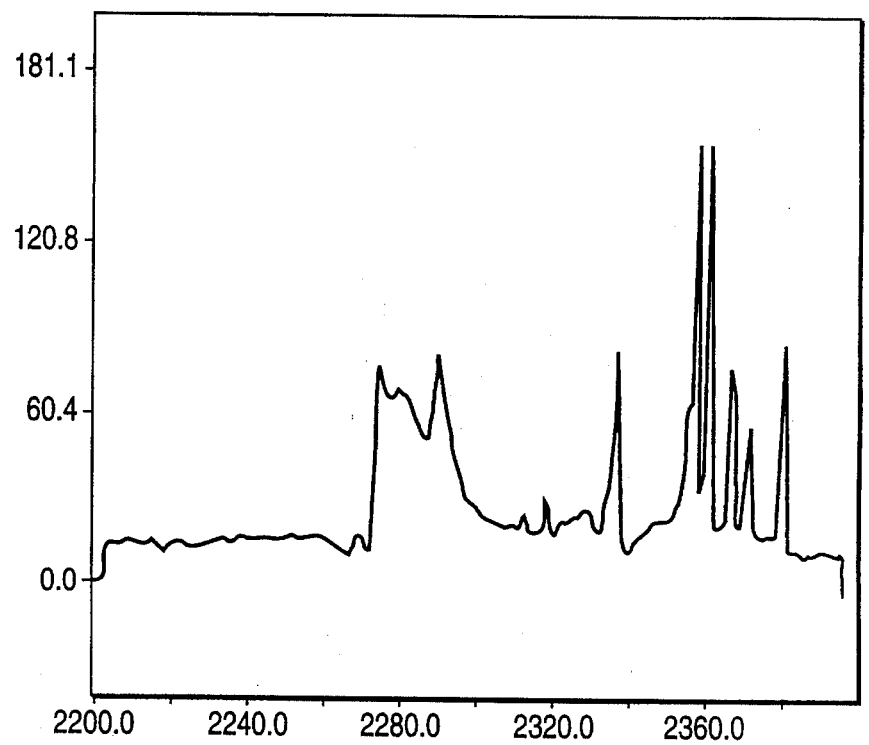
FIG. 5 is a diagrammatic view of the raw data from measuring the reflection characteristics of the surface of the article depicted in FIG. 3.
Figure 6:
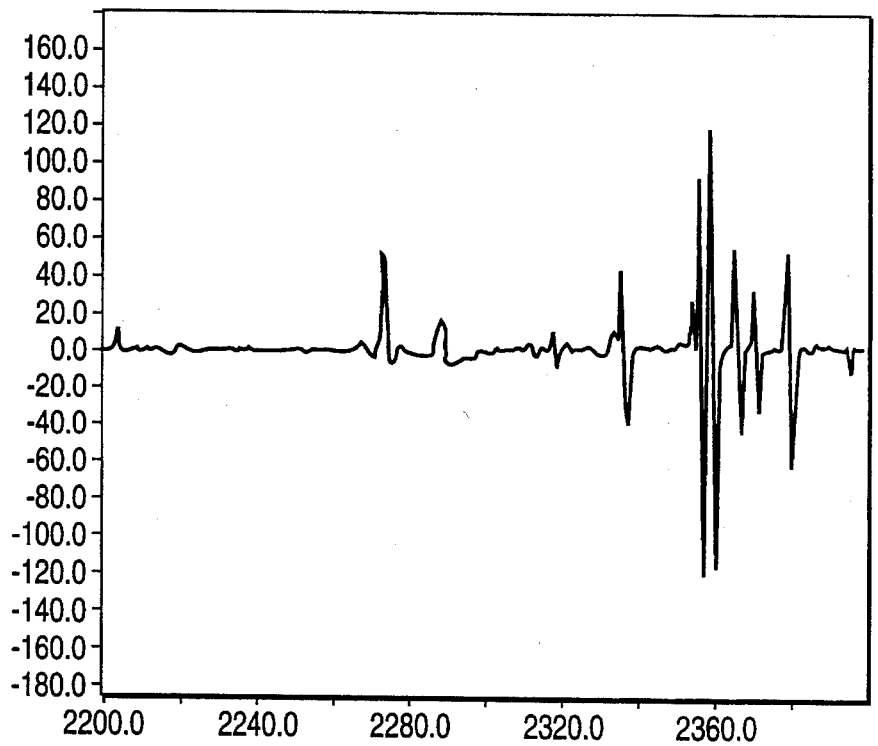
FIG. 6 is a diagrammatic view of the difference data from measuring the reflection characteristics of the surface of the article depicted in FIG. 3.
Figure 7:
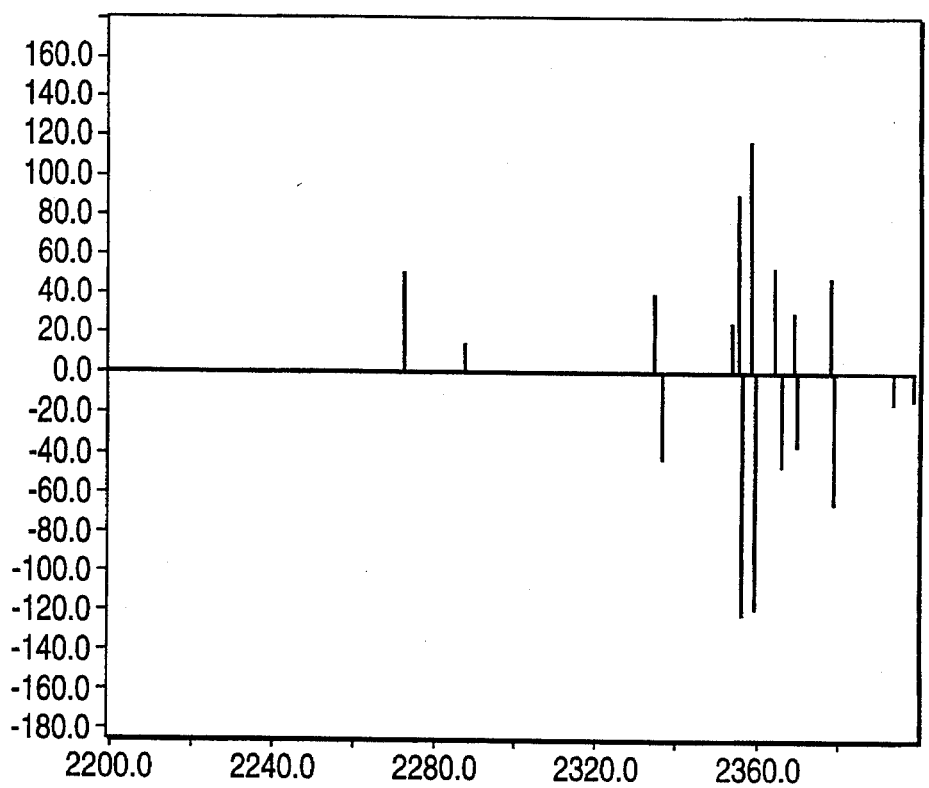
FIG. 7 is a diagrammatic view of the peaks/valleys of difference data from measuring the reflection characteristics of the surface of the article depicted in FIG. 3.
Figure 8:
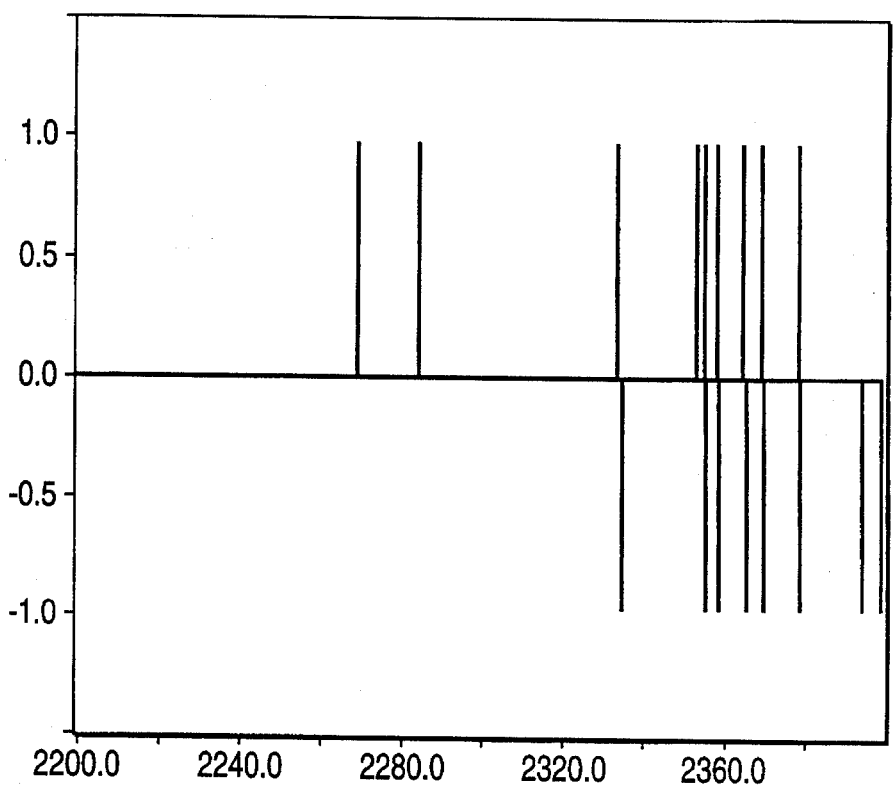
FIG. 8 is a diagrammatic view of the threshold and clipped version of peak/valley difference data from measuring the reflection characteristics of the surface of the article depicted in FIG. 3.
Figure 9:
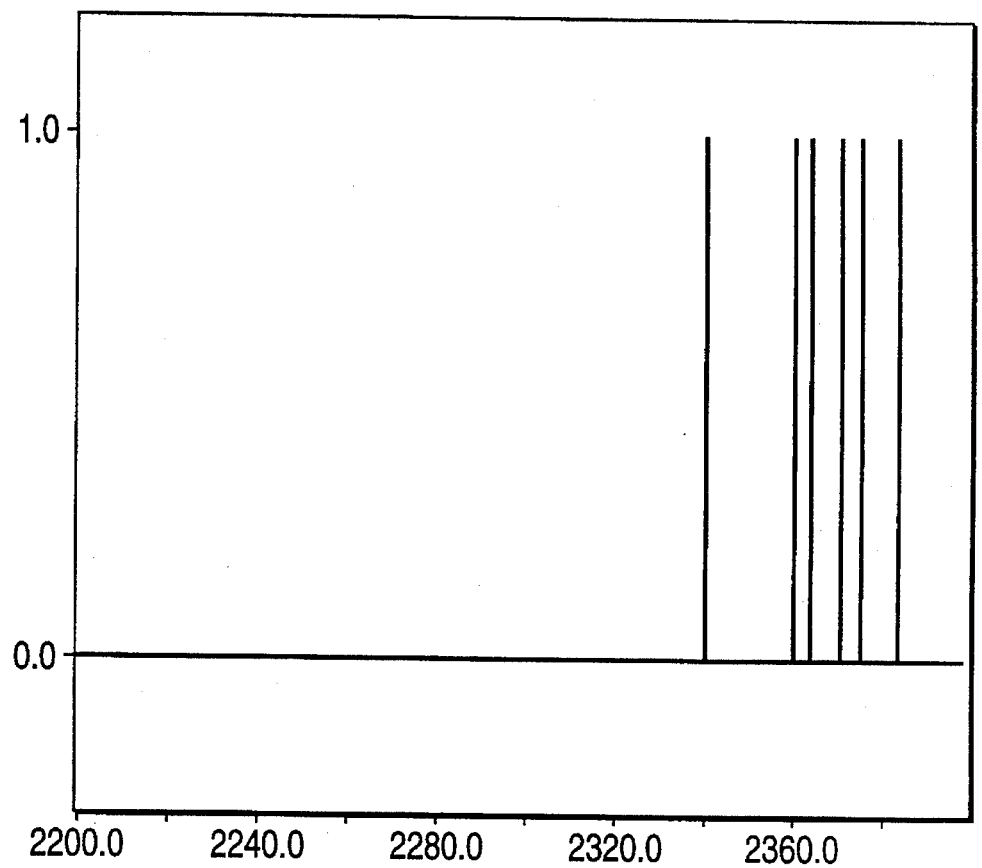
FIG. 9 is a diagrammatic view of peaks of raw data from measuring the reflection characteristics of the surface of the article depicted in FIG. 3.

The features of the invention described above can be more easily understood by a review of FIGS. 5–9, which diagrammatically depict steps that the algorithm proceeds through to reach a determination as to whether the surface deviations on the article depicted in FIG. 3 correlate to that of a known pattern of surface deviations. As broadly embodied herein, FIGS. 5–9 depict the following information. FIG. 5 shows the raw data measured from the reflection characteristics of the surface 28 of the article 24. FIG. 6 shows the difference data measured from the reflection characteristics of the surface 28 of the article 24. FIG. 7 shows the peaks/valleys of difference data measured from the reflection characteristics of the surface 28 of the article 24. FIG. 8 shows the threshold and clipped version of peak/valley difference data measured from the reflection characteristics of the surface 28 of the article 24. Finally, FIG. 9 shows the peaks of raw data measured from the reflection characteristics of the surface 28 of the article 24. CPU 34 uses a computer algorithm to compare these peaks of raw data to known patterns of surface deviations to determine if a match exists.

A microscopic examination of a selection of articles (aluminum can tops) were incised and evaluated to determine the properties causing a strong reflection signal, thereby making a small incised trough approximately 0.001 to 0.002 inches wide and deep a preferred surface deviation. Rounded corners at the bottom inside edges of the incised troughs contributed significantly to a wide reflecting signal return. Additionally, small irregularities on the walls and bottom of the trough provide an array of point source reflectors. Further examination showed individual diffraction patterns. However, simply scraping marks onto the surface of the article left too smooth of a transition from a base surface resulting in specular reflection only occurring at specific angles.

Based on the microscopic examination, a series of visual tests were performed with variable light sources and observation angles to find the optimum configuration. High angles away from perpendicular to the surface provide a higher return. The view angle should not hide the floor wall corner of the incised trough. Moreover, unequal angles for the observer camera 30 and laser diode 22 have the highest contrast return.

The effects of the can top surface finish on pattern detectability were examined. The brush finish of the strong specular glare is perpendicular to the direction of the finish grooves. Additionally, the can's surface curvature spreads the glare over a wide angle. Therefore, reflection from incisement markings may become lost in the glare from the top surface for parallel orientation of the incised line and the direction of brush marks on the surface finish.

An incised pattern of surface deviations is not easily copied or added to an article after the fact. An even scraping action produces a trough which is too smooth and does not give a strong return over a range of angles. The smooth walls have a very high specular reflection coefficient which makes them very angle-sensitive.

During algorithm development, the following observations have been made. The most distinctive characteristic of the incisement is its positive and negative contrast within two to three pixels. The manually-scribed or scraped cans reasonably duplicate actual can incisement with respect to width, but do not provide uniform contrast differences between incised lines. For a given geometry and lining arrangement, the contrast difference provided by the specular reflection of incisement varies significantly by can type (e.g. a range of 30–150 counts out of a full scale 255 count range). In an experiment using 64,000 data point sets from three cans with no scraped pattern, a tight four or five line mask yielded no false detections.

A method for identifying information stored in a surface of an article according to the present invention comprises the steps of: introducing the article 24 having predetermined surfaces deviations 26 to a reading area; illuminating the article 24 having predetermined surface deviations 26; measuring reflection characteristics of the surface 28 of the article 24; identifying surface deviations 26 by the reflection characteristics of the surface 28; comparing surface deviations 26 to at least one known pattern of surface deviations; and determining whether the surface 28 of the article 24 contains identifying information. Additionally, the method may comprise the step of inserting the article into a reverse vending machine prior to introducing the article to the reading area. The method may further comprise the step of rejecting the article not having at least one known pattern of surface deviations after determining whether the surface of the article contains identifying information. Finally, the method may further comprise the step of densifying the article having at least one known pattern of surface deviations after determining whether the surface of the article contains identifying information and then storing the densified article.

Figure 10:
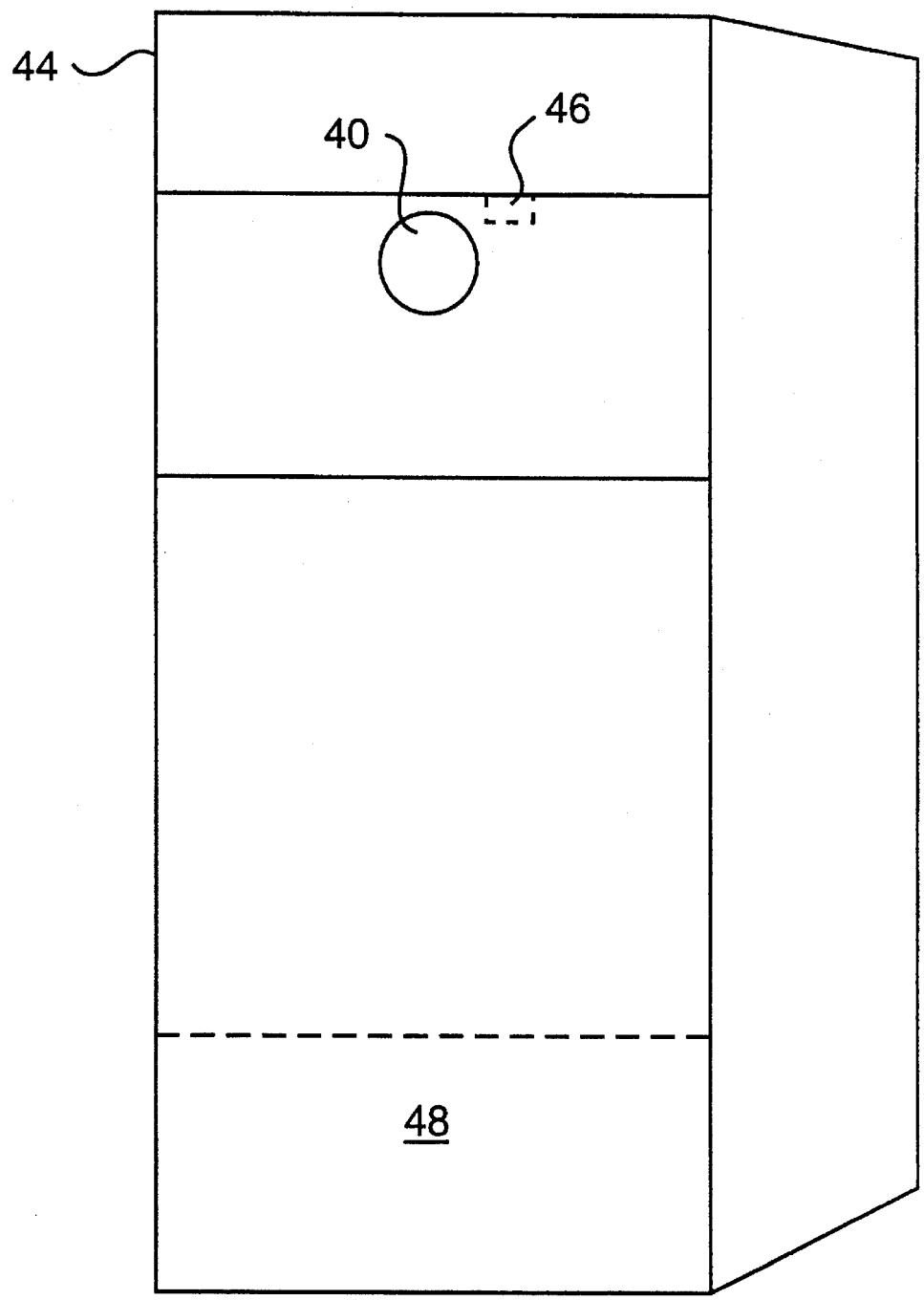
FIG. 10 is a schematic of the apparatus according to the present invention mounted within a reverse vending machine.

In accordance with the invention, an assembly for identifying information contained in deviations in a surface of an article or, more particularly, a container, can be installed in a reverse vending machine. As broadly embodied herein, and referring to FIG. 10, a reverse vending machine 42 includes a cabinet 44. A container-receiving mechanism 40, which may be for example a door or chute, is provided in the cabinet 44. The information identifying assembly 20 of the present invention is mounted within the cabinet 44, to determine whether received containers have surface deviations 26 correlating to a known pattern of surface deviations. The known patterns of surface deviations may correspond to information identifying the point of sale information, point of manufacture, product, brand, or the like. The assembly for identifying information 20 may operate in conjunction with a laser scanner barcode reader 46 to assist in the accounting requirements for accurate record keeping in the reverse vending machine 42. Finally, a storage portion 48 is provided to receive the containers. Various configurations of reverse vending machines are well known, and therefore will not be discussed here in further detail. The assembly for identifying information contained in surface deviations of the present invention is suitable for use with a number of reverse vending machines, and can be modified as necessary for a particular configuration.

A laser scanner may be provided for verifying whether the inserted article is a participating commodity. In order to determine whether an inserted article is a "participating" article, the laser scanner is attached to a reverse vending machine to detect the presence of and read barcodes. As disclosed in U.S. Pat. No. 4,784,251, owned by Applicants' assignee, the description of which is incorporated herein by reference, the laser scanner may include a low power laser emitter and a laser reader. The laser emitter of the laser scanner projects a light pattern across the surface of the inserted article which is received by the laser reader thereby reading the barcode. The inserted article 24 is rotated to ensure that the laser scanner reads the barcode.

If the laser scanner does not detect a barcode on the inserted article, the article is rejected as a "nonparticipating article" which is returned to the consumer through the reject port.

The laser scanner rejects commodities as nonparticipating if a barcode is not found in order to reject any nonrecyclable object which might be inserted into the reverse vending machine. The laser scanner also rejects objects without a barcode, or with barcodes that cannot be matched, because retailers and distributors of the containers are compensated for recycling and billed for the scrap value of the material through use of information obtained by reading the barcode. The proper credits and debits cannot be made if a barcode cannot be read and matched. Thus, a number of barcodes are placed in the memory of the laser scanner so that various different articles may be accepted. If the laser scanner does detect, read and match a barcode, the article is a "participating article," and the article is stored according to other information obtained by the reverse vending machine.

Other embodiments of the invention will be apparent to those skilled in the art from consideration of the specification and practice of the invention disclosed herein. It is intended that the specification be considered as exemplary only, with a true scope and spirit being indicated by the following claims.

We claim:

1. A method for identifying information stored in a surface of a container, comprising the steps of:
   introducing the container having predetermined surface deviations to a reading area, the predetermined surface deviations including a plurality of arcs;
   illuminating the container;
   measuring reflection characteristics of the surface of the container;
   identifying surface deviations by the reflection characteristics of the surface;
   comparing surface deviations to at least one known pattern of surface deviations; and
   determining whether the surface of the container contains identifying information.

2. The method of claim 1, wherein the plurality of arcs are oriented relative to a point on the surface of the container providing an origin for the plurality of arcs.

3. The method of claim 2, wherein the spacing between the plurality of arcs varies.

4. A method for identifying information stored in a surface of an article, comprising the steps of:
   forming one of incised predetermined surface deviations and indented predetermined surface deviations in the surface of the article;
   inserting the article into a reverse vending machine;
   introducing the article having predetermined surface deviations to a reading area;
   illuminating the article;
   measuring reflection characteristics of the surface of the article;
   identifying surface deviations by the reflection characteristics of the surface;
   comparing surface deviations to at least one known pattern of surface deviations; and
   determining whether the surface of the article contains identifying information.

5. A method for identifying information stored in a surface of an article, comprising the steps of:
   forming one of incised predetermined surface deviations and indented predetermined surface deviations in the surface of the article;
   introducing the article having predetermined surface deviations to a reading area;
   illuminating the article;
   measuring reflection characteristics of the surface of the article;
   identifying surface deviations by the reflection characteristics of the surface;
   comparing surface deviations to at least one known pattern of surface deviations;
   determining whether the surface of the article contains identifying information; and
   densifying the article having at least one know pattern of surface deviations.

6. The method of claim 5, further comprising the step of storing the densified article.

7. A method for identifying information stored in a surface of a container having predetermined surface deviations incised into the surface, the surface deviations including a plurality of arcs oriented relative to a point on the surface of the container, the point providing an origin for the plurality of arcs, the arcs having a predetermined uniquely identifiable and variable spacing between one another, comprising the steps of:
   introducing the container to a reading area;
   illuminating the container;
   measuring reflection characteristics of the surface of the container;
   identifying surface deviations by the reflection characteristics of the surface;
   comparing surface deviations to at least one known pattern of surface deviations; and
   determining whether the surface of the container contains identifying information.

8. A method for storing and retrieving information on a surface of a container, comprising the steps of:
   providing a pattern of predetermined configurations corresponding to a known quantity of information and having a known reflection signal when transferred to a specific material, the pattern includes a plurality of arcs;
   placing the pattern on the surface of the container;
   illuminating the surface of the container;
   measuring reflection characteristics of the surface of the container; and
   determining whether the pattern is on the container.

9. The method of claim 8, wherein the plurality of arcs are oriented relative to a point on the surface of the container providing an origin for the plurality of arcs.

10. The method of claim 9, wherein the spacing between the plurality of arcs varies.

11. A product identification assembly, comprising:
    a generally cylindrical container having opposite ends and an axis extending through the ends about the center of gravity of the container, the container having a surface with a portion of the surface defining a base reflection characteristic and a pattern defined in the portion, the pattern comprising surface deviations corresponding to a known quantity of information and having a known reflection signal when exposed to a predetermined radiation, the pattern including a plurality of lines on at least one of the ends of the container and oriented at a predetermined location relative to the axis;
    a radiating device for providing a predetermined wavelength to the surface of the container to produce reflection signals from the surface of the container;
    an observation device for gathering data on the reflection signals from the surface of the container; and
    an identifying device for verifying the pattern defined in the surface of the container.

12. The assembly of claim 11, wherein the portion of the surface having the pattern is of a uniform color.

13. A product identification assembly, comprising:
    a generally cylindrical container having opposite ends and an axis extending through the ends about a center of gravity of the container, the container having a surface with a portion of the surface defining a base reflection characteristic and a pattern defined in the portion, the pattern comprising incised surface deviations corresponding to a known quantity of information and having a known reflection signal when exposed to a predetermined radiation, the pattern including a plurality of lines on at least one of the ends of the container and oriented at a predetermined location relative to the axis;
    a radiating device for providing a predetermined wavelength to the surface of the container to produce reflection signals from the surface of the container;

an observation device for gathering data on the reflection signals from the surface of the container; and an identifying device for verifying the pattern defined in the surface of the container.

14. A product identification assembly, comprising:

a generally cylindrical article having opposite ends and an axis extending through the ends about a center of gravity of the article, the article having a surface with two portions of the surface defining a base reflection characteristic and a pattern defined in each portion, each pattern comprising surface deviations corresponding to a known quantity of information and having a known reflection signal when exposed to a predetermined radiation, each pattern including a plurality of arcs on at least one of the ends of the article and concentrically oriented at a predetermined location about the axis, the plurality of arcs within each pattern each having a different radius, at least a portion of each of the plurality of arcs within each pattern being within a same sector of at least one of the ends of the article, the two pluralities of arcs being spaced between 30 and 150 degrees apart;

a radiating device for providing a predetermined wavelength to the surface of the article to produce reflection signals from the surface of the article;

an observation device for gathering data on the reflection signals from the surface of the article; and an identifying device for verifying the pattern defined in the surface of the article.

15. A container having a surface with information stored therein, comprising:

a portion on the surface of the container, the portion defining a base reflection characteristic; and one of an incised pattern and an indented pattern including a plurality of arcs defined in the portion, the pattern comprising surface deviations corresponding to a known quantity of information and having a known reflection signal when exposed to a predetermined radiation.

16. The article of claim 15, wherein the portion of the surface having the pattern is of a uniform color.

17. An article having a surface with information stored therein, comprising:

a portion on the surface of the article, the portion defining a base reflection characteristic; and one of an incised pattern and an indented pattern including a plurality of arcs defined in the portion, the pattern comprising surface deviations corresponding to a known quantity of information and having a known reflection signal when exposed to a predetermined radiation, the pattern being within a generally rectangular area of 0.25 by 0.26 inches.

18. An article having a surface with information stored therein, comprising:

a portion on the surface of the article, the portion defining a base reflection characteristic; and one of two identical incised patterns and two identical indented patterns, each pattern including a plurality of arcs defined in the portion, the plurality of arcs being oriented relative to a point on the surface of the article providing an origin for the plurality of arcs, the two patterns being spaced between 30 and 150 degrees apart relative to the same origin, the pattern comprising surface deviations corresponding to a known quantity of information and having a known reflection signal when exposed to a predetermined radiation.

19. The article of claim 18, wherein the pattern has five arcs, each arc having an arc section of 0.25 inches, a depth of 0.001 to 0.002 inches, and a width of 0.001 to 0.002 inches.

20. The article of claim 19, wherein the spacing between the five arcs from an inner arc closest to the origin to the outer arc is 0.05, 0.06, 0.07, and 0.08 inches respectively.

21. A reverse vending machine, comprising:

(a) a cabinet;

(b) a mechanism in the cabinet for receiving a generally cylindrical container having opposite ends and an axis extending through the ends about the center of gravity of the container, the container having a surface with a portion of the surface defining a base reflection characteristic and a pattern defined in the portion, the pattern comprising one of incised surface deviations and indented surface deviations corresponding to a known quantity of information and having a known reflection signal when exposed to a predetermined radiation, the pattern including a plurality of lines on at least one of the ends of the container and oriented at a predetermined location relative to the axis;

(c) an assembly for identifying information contained in the deviations in the surface of the container, the assembly contained in the cabinet and comprising:

means for radiating the container to provide a reflection from the deviations in the surface of the container;

means for observing the deviations by the reflection caused by radiating the surface of the container; and means for identifying the deviations in the surface of the container and determining whether the identified deviations correlate to a known pattern of surface deviations; and (d) a storage portion configured to receive the container.

22. An article having a surface with information stored therein, comprising:

a portion on the surface of the article, the portion defining a base reflection characteristic; and one of two identical incised patterns and two identical indented patterns, each pattern including a plurality of arcs defined in the portion, the plurality of arcs being oriented relative to a point on the surface of the article providing an origin for the plurality of arcs, the two patterns being approximately 150 degrees apart relative to the same origin, the pattern comprising surface deviations corresponding to a known quantity of information and having a known reflection signal when exposed to a predetermined radiation.

23. A method of identifying selected information stored in a surface of a container, comprising the steps of:

forming one of incised predetermined surface deviations and indented predetermined surface deviations in a portion of the surface of the container, the portion containing the deviations being of a uniform color;

introducing the container having predetermined surface deviations to a reading area;

illuminating the container;

measuring reflection characteristics of the surface of the container;

identifying surface deviations by the reflection characteristics of the surface;

comparing the surface deviations to at least one known pattern of surface deviations; and determining whether the surface of the container contains the selected information.

* * * * *